United States Patent
Chern et al.

(10) Patent No.: US 9,372,326 B2
(45) Date of Patent: Jun. 21, 2016

(54) ASSEMBLY OF ZOOM LENS MODULE AND ZOOM IMAGING MODULE

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: EVERREADY PRECISION IND. CORP., Kaohsiung (TW)

( * ) Notice: Subject to any disclaimer, the term of this patent is extended or adjusted under 35 U.S.C. 154(b) by 25 days.

(21) Appl. No.: 14/595,854

(22) Filed: Jan. 13, 2015

(65) Prior Publication Data

US 2016/0124198 A1    May 5, 2016

(30) Foreign Application Priority Data

Oct. 31, 2014 (TW) .............................. 103137853 A
Oct. 31, 2014 (TW) .............................. 103137859 A
Oct. 31, 2014 (TW) .............................. 103219371 U

(51) Int. Cl.
| | |
|---|---|
| *G02B 7/02* | (2006.01) |
| *G02B 15/04* | (2006.01) |
| *G02B 7/16* | (2006.01) |
| *G11B 7/09* | (2006.01) |
| *G02B 7/04* | (2006.01) |

(52) U.S. Cl.
CPC ................ *G02B 15/04* (2013.01); *G02B 7/021* (2013.01); *G02B 7/04* (2013.01); *G02B 7/16* (2013.01); *G11B 7/0935* (2013.01)

(58) Field of Classification Search
CPC .......... G02B 7/02; G02B 7/021; G02B 7/023; G02B 7/04; G11B 7/0935
USPC ......................... 359/811, 813, 819, 821, 822
See application file for complete search history.

(56) References Cited

U.S. PATENT DOCUMENTS 5,128,808 A * 7/1992 Dosaka ................... G02B 21/08
359/233

* cited by examiner

*Primary Examiner* — William Choi
(74) *Attorney, Agent, or Firm* — Muncy, Geissler, Olds & Lowe, P.C.

(57) ABSTRACT

An assembly of zoom lens module includes a main lens, plural associate lens and a rotator mechanism. The plural associated lens disposed around the mail lens and each associated lens has a shiftable lens element shifted by the rotator mechanism. When the rotator mechanism rotates, plural shiftable lens elements are shifted such that the zoom effects of the plural associate lens can be changed. Therefore, the assembly of zoom lens module may provide plentiful zoom effects without increasing the volume, particularly the total track length, and weight of the zoom lens assembly.

22 Claims, 6 Drawing Sheets

ASSEMBLY OF ZOOM LENS MODULE AND ZOOM IMAGING MODULE

FIELD OF THE INVENTION

The present invention relates to the field of assembly of lens module and imaging module, and especially relates to the assembly of lens module applied to slim portable opto-electronic device and image-capturing device, module, or apparatus.

BACKGROUND OF THE INVENTION

By the help of current technology developments, many useful functions that have been performed on various electronic apparatus are now possibly implemented on slim portable electronic device, such as smart mobile phones, tablets, or wearable devices. The functions include voice assistant, 3D imaging, mutual interactive, and so on. It is a trend for modern people to be keen on taking pictures and photos, and hence, imaging module has been a standard function for portable electronic device or apparatus. In plural functions of imaging module, zoom function is being favorite and popular by users because it performs different zoom in and out and different fields of views. However, it is difficult to have zoom function in imaging module for slim optoelectronic devices, e.g., smart phone. Their major limitation is the size or the thickness of the device.

FIG. 1 is a schematic cross-view diagram illustrating a present imaging module. Please refer to FIG. 1, a present imaging module 1 includes a lens assembly 11 and a sensor 12. The lens assembly 11 includes a housing 111, plural fixed lens elements 112, a movable lens element 113, an aperture 114, and a moving mechanism 115. The plural fixed lens elements 112 are fixedly accommodated within the housing 111. Compared to the fixed lens elements 112, the movable lens element 113 is coupled to the moving mechanism 115, moved by the moving mechanism 115, and movably accommodated within the housing 111. The aperture 114, which is capable of controlling the amount of light entering the lens assembly 11, is deposited at one side of the movable lens element 113 and on an optical axis 110 of the lens assembly 11. The sensor 12, which receives light passing through the plural fixed lens elements 112 and the movable lens element 113 and then images, is deposited at one side of the plural fixed lens elements 112 and the movable lens element 113, and aligned on the optical axis 110. Here, the movable lens 113 is inside the module, while the size of the whole module is fixed. This kind of zooming is named as "internally focusing" in literature. In general, there are several moving mechanisms inside a zooming module and hence, the size of the whole module will not be fixed.

FIG. 2 is a schematic cross-view diagram illustrating zooming process performed by a user's present imaging module. Please refer to FIG. 1 and FIG. 2, when an object is imaged by a present imaging module 1, outside light enters into the housing 111 and then passes through the fixed lens elements 112, the movable lens element 113, the other fixed lens elements 112, and the aperture 114 in sequence, and hence, reaches the sensor 12 to be imaged to form the image of the object. Provided that the object is located far away from the present imaging module 1, the user may take a picture for the object by using the zoom function of the present imaging module 1 that is also called zoom in/zoom out function. The operation procedure is illustrated as follows: the moving mechanism 115 is driven to shift the movable lens element 113 to a corresponding position shown in FIG. 2. Next, the outside light enters into the housing 111 and then passes through the fixed lens elements 112, the movable lens element 113, the other fixed lens elements 112, and the aperture 114 in sequence, and hence, reaches the sensor 12 to be imaged to form the zooming image of the object.

Besides, other present imaging module also includes a lens assembly and a sensor, and the lens assembly also includes a housing, plural fixed lens elements, a movable lens element, an aperture, and a moving mechanism. Compared to the one in FIG. 1 and FIG. 2, the moving mechanism of the other one is driven to shift the movable lens element in a direction vertical to the optical axis, and the zoom function is performed. However, such a design definitely forms the lens assembly with a bigger total width.

Zoom function is very important for imaging and photographing, however, zoom capability is subject to the total width or length of the lens assembly 11. The longer or wider the total length or width is, the bigger the zoom capability performs. On the other hand, the shorter or narrower the total length or width is, the smaller the zoom capability performs. Consequently, the zoom capability is improved with the increase in the total length and weight of the lens assembly, as well as the volume.

Accordingly, a lens assembly with better zoom capability and in a slim size is necessary for current demand in mobile electric device, module, or apparatus.

SUMMARY OF THE INVENTION

To resolve the drawbacks aforementioned, an assembly of zoom lens module and a zoom imaging module are provided herein, which include plural lenses and each of the lenses includes plural lens elements. The optical power of partial lenses is changed by operating, such as rotating, moving, or shifting, directly or indirectly, to change the staggered configuration of the lens elements.

Accordingly, an assembly of zoom lens module includes: a housing; a plurality of lenses staggered deposited within the housing, wherein each of the lenses comprises a plurality of lens elements and a plurality of optical axes defined by the lens elements; and a rotator mechanism deposited onto the housing, the rotator mechanism shifting one of the lenses to change relative positions of the lens elements that correspond to the lenses different from the operated one, wherein the plural optical axes are kept fixed before and after operating the corresponding rotator mechanisms.

In an embodiment, a main lens of the lenses comprises a first fixed main lens element and a second fixed main lens element, and the first fixed main lens element and the second fixed main lens element are kept a fixed staggered arrangement that is not subject to the rotator mechanism, and wherein the first fixed main lens element together with the second fixed main lens element defines a main optical axis of plural optical axes, and the first fixed main lens element and the second fixed main lens element are in center zones of a first associate lens and a second associate lens of the lenses, respectively.

In an embodiment, the first associate lens and the second associate lens surround the main lens; the first associate lens comprises: a first fixed associate lens element deposited within the housing and positioned at a first side of the main lens; and a first shiftable lens element positioned at one side of the first fixed associate lens element and coupled to the rotator mechanism, wherein staggered arrangement of the first fixed associate lens element and the first shiftable lens element is changed along with the operation of the rotator mechanism; and the second associate lens comprises: a second fixed associate lens element deposited within the housing and positioned at a second side of the main lens; and a second shiftable lens element positioned at one side of the second fixed associate lens element and coupled to the rotator mechanism, wherein staggered arrangement of the second fixed associate lens element and the second shiftable lens element is changed along with the operation of the rotator mechanism.

In an embodiment, a first optical axis of the optical axes is defined by the first fixed associate lens element and the first shiftable lens element; a second optical axis of the optical axes is defined by the second fixed associate lens element and the second shiftable lens element; and when the rotator mechanism is operated, the first shiftable lens element is shifted to the side of the second fixed associate lens element and aligned on the second optical axis, and the second shiftable lens element is shifted to the side of the first fixed associate lens element and aligned on the first optical axis.

In an embodiment, a third associate lens of the lenses together with the first associate lens and the second associate lens surround the main lens; the third associate lens comprises: a third fixed associate lens element deposited within the housing and positioned at a third side of the main lens; and a third shiftable lens element positioned at one side of the third fixed associate lens element and coupled to the rotator mechanism, wherein staggered arrangement of the third fixed associate lens element and the third shiftable lens element is changed along with the operation of the rotator mechanism.

In an embodiment, a first optical axis of the optical axes is defined by the first fixed associate lens element and the first shiftable lens element; a second optical axis of the optical axes is defined by the second fixed associate lens element and the second shiftable lens element; a third optical axis of the optical axes is defined by the third fixed associate lens element and the third shiftable lens element; and when the rotator mechanism is operated, the first shiftable lens element is shifted to the side of the second fixed associate lens element and aligned on the second optical axis, the second shiftable lens element is shifted to the side of the third fixed associate lens element and aligned on the third optical axis, and the third shiftable lens element is shifted to the side of the first fixed associate lens element and aligned on the first optical axis.

In an embodiment, the rotator mechanism is associated with manual form, mechanical form, electric form, electronic form, magnetic form, or the combination thereof.

In an embodiment, a positioning mechanism is deposited onto the rotator mechanism, wherein the positioning mechanism performs lock function to restrict the operation strength, orientation, or direction of the rotator mechanism, or release function to permit the operation of the rotator mechanism.

In accordance with another aspect of the present invention, an assembly of zoom lens module includes: a housing; a plurality of lenses staggered deposited within the housing, wherein each of the lenses comprises a plurality of lens elements and a plurality of optical axes defined by the lens elements of each of the lenses; and a rotator mechanism deposited onto the housing, the rotator mechanism shifting one of the lenses to change relative positions of the lens elements that correspond to the lenses different from the operated one, wherein the plural optical axes are kept fixed before and after operating the rotator mechanism.

In an embodiment, a fixed lens of the lenses comprises a first fixed associate lens element, a first fixed main lens element and a second fixed associate lens element, and the first fixed main lens element, the first fixed associate lens element, and the second fixed associate lens element are kept a fixed arrangement that is not subject to the rotator mechanism, and wherein the first fixed main lens element is in center zones of the first fixed associate lens element and the second associate lens element.

In an embodiment, a second lens of the lenses is at one side of the first lens and coupled to the rotator mechanism; the second lens comprises a first shiftable lens element, a second fixed main lens element, and a second shiftable lens element; the second fixed main lens element is in center zones of the first shiftable lens element and the second shiftable lens element; and the first shiftable lens element and the second shiftable lens element are shifted along with the operation of the rotator mechanism.

In an embodiment, the first fixed main lens element and the second fixed main lens element are staggered to form a main lens; the first fixed associate lens element and the first shiftable lens element are staggered to form a first associate lens; the second fixed associate lens element and the second shiftable lens element are staggered to from a second associate lens, and staggered arrangement of the lens elements that belong to the first associate lens and the second associate lens is changed along with the operation of the rotator mechanism.

In an embodiment, a first optical axis of the optical axes is defined by the first fixed associate lens element and the first shiftable lens element; a second optical axis of the optical axes is defined by the second fixed associate lens element and the second shiftable lens element; and when the rotator mechanism is operated, the first shiftable lens element is shifted to the side of the second fixed associate lens element and aligned on the second optical axis, and the second shiftable lens element is shifted to the side of the first fixed associate lens element and aligned on the first optical axis.

Accordingly, a zoom imaging module includes: a base; an assembly of zoom lens module, the assembly of zoom lens module comprising: a housing; a plurality of lenses staggered deposited within the housing, wherein each of the lenses comprises a plurality of lens elements and a plurality of optical axes defined by the lens elements; and a rotator mechanism deposited onto the housing, the rotator mechanism shifting one of the lenses to change relative positions of the lens elements that correspond to the lenses different from the operated one, wherein the plural optical axes are kept fixed before and after operating the rotator mechanism; and a sensing member deposited within the housing and sensing outside light.

In an embodiment, a main lens of the lenses comprises a first fixed main lens element and a second fixed main lens element, and the first fixed main lens element and the second fixed main lens element are kept a fixed staggered arrangement that is not subject to the rotator mechanism, and wherein the first fixed main lens element together with the second fixed main lens element defines a main optical axis of plural optical axes, and the first fixed main lens element and the second fixed main lens element are in center zones of a first associate lens and a second associate lens of the lenses, respectively.

In an embodiment, the first associate lens and the second associate lens surround the main lens;

In an embodiment, the first associate lens comprises: a first fixed associate lens element deposited within the housing and positioned at a first side of the main lens; and a first shiftable lens element positioned at one side of the first fixed associate lens element and coupled to the rotator mechanism, wherein staggered arrangement of the first fixed associate lens element and the first shiftable lens element is changed along with the operation of the rotator mechanism; and a sensing member deposited within the housing and sensing outside light.

In an embodiment, a main lens of the lenses comprises a first fixed main lens element and a second fixed main lens element, and the first fixed main lens element and the second fixed main lens element are kept a fixed staggered arrangement that is not subject to the rotator mechanism, and wherein the first fixed main lens element together with the second fixed main lens element defines a main optical axis of plural optical axes, and the first fixed main lens element and the second fixed main lens element are in center zones of a first associate lens and a second associate lens of the lenses, respectively.

In an embodiment, the first associate lens and the second associate lens surround the main lens; the first associate lens comprises: a first fixed associate lens element deposited within the housing and positioned at a first side of the main lens; and a first shiftable lens element positioned at one side of the first fixed associate lens element and coupled to the rotator mechanism, wherein staggered arrangement of the first fixed associate lens element and the first shiftable lens element is changed along with the operation of the rotator mechanism; and the second associate lens comprises: a second fixed associate lens element deposited within the housing and positioned at a second side of the main lens; and a second shiftable lens element positioned at one side of the second fixed associate lens element and coupled to the rotator mechanism, wherein staggered arrangement of the second fixed associate lens element and the second shiftable lens element is changed along with the operation of the rotator mechanism.

In an embodiment, a first optical axis of the optical axes is defined by the first fixed associate lens element and the first shiftable lens element; a second optical axis of the optical axes is defined by the second fixed associate lens element and the second shiftable lens element; and when the rotator mechanism is operated, the first shiftable lens element is shifted to the side of the second fixed associate lens element and aligned on the second optical axis, and the second shiftable lens element is shifted to the side of the first fixed associate lens element and aligned on the first optical axis.

In an embodiment, a third associate lens of the lenses together with the first associate lens and the second associate lens surround the main lens; the third associate lens comprises: a third fixed associate lens element deposited within the housing and positioned at a third side of the main lens; and a third shiftable lens element positioned at one side of the third fixed associate lens element and coupled to the rotator mechanism, wherein staggered arrangement of the third fixed associate lens element and the third shiftable lens element is changed along with the operation of the rotator mechanism.

In an embodiment, a first optical axis of the optical axes is defined by the first fixed associate lens element and the first shiftable lens element; a second optical axis of the optical axes is defined by the second fixed associate lens element and the second shiftable lens element; a third optical axis of the optical axes is defined by the third fixed associate lens element and the third shiftable lens element; and when the rotator mechanism is operated, the first shiftable lens element is shifted to the side of the second fixed associate lens element and aligned on the second optical axis, the second shiftable lens element is shifted to the side of the third fixed associate lens element and aligned on the third optical axis, and the third shiftable lens element is shifted to the side of the first fixed associate lens element and aligned on the first optical axis.

In an embodiment, the sensing member is divided into plural sensing zones corresponding to the lenses, or is consisted of plural individual sensing blocks.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

In the present invention, a lens assembly may have plural lenses, and each of the lenses can have one or more lens elements. The plural lens elements may be staggered along the optical axes of the lenses. That is, the distances from an objective plane or an image plane to these lens elements are different. In manufacturing, the different lens elements vertical to the optical axes can be formed on the different lenses, or integrated into a lenses sheet in a suitable way, such as plastic molding. The different lens elements on a single-piece lens may perform their own functions and be illustrated in the following paragraphs.

Figure 1:
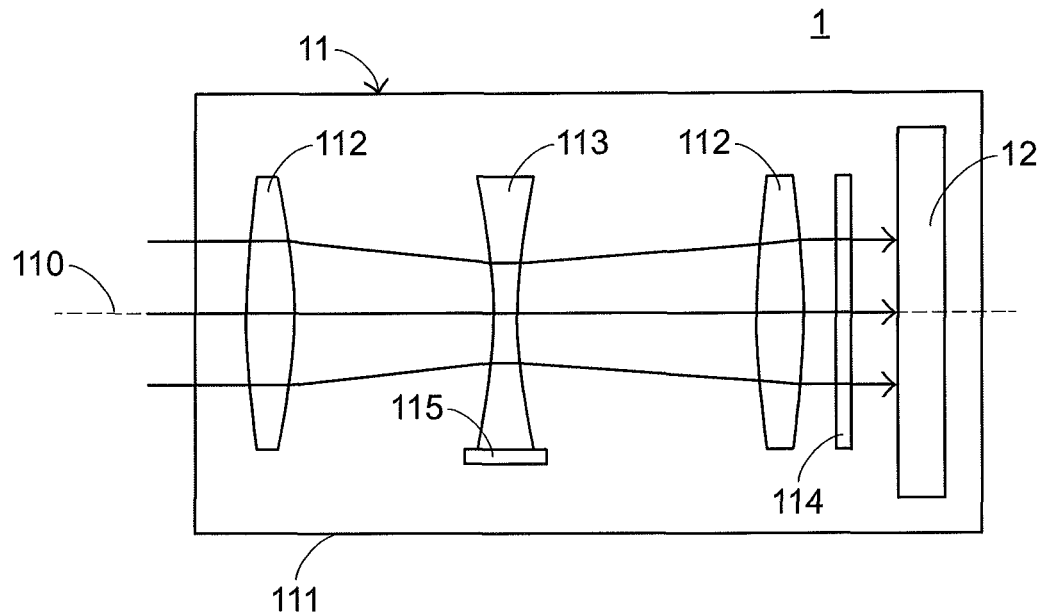
FIG. 1 is a schematic cross-view diagram illustrating a present imaging module.
Figure 2:
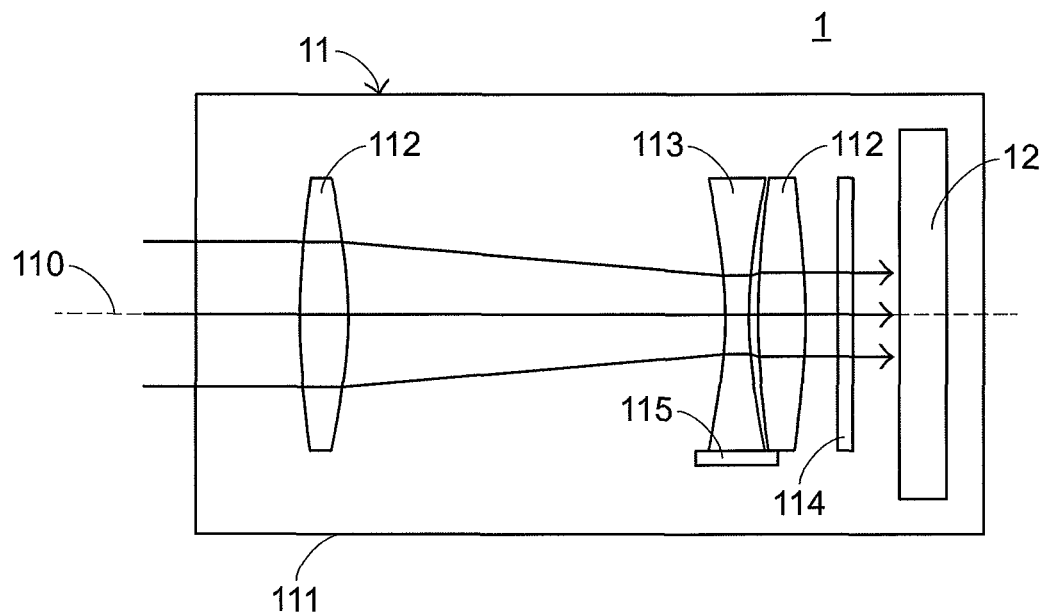
FIG. 2 is a schematic cross-view diagram illustrating zooming process performed by a user's present imaging module.
Figure 3:
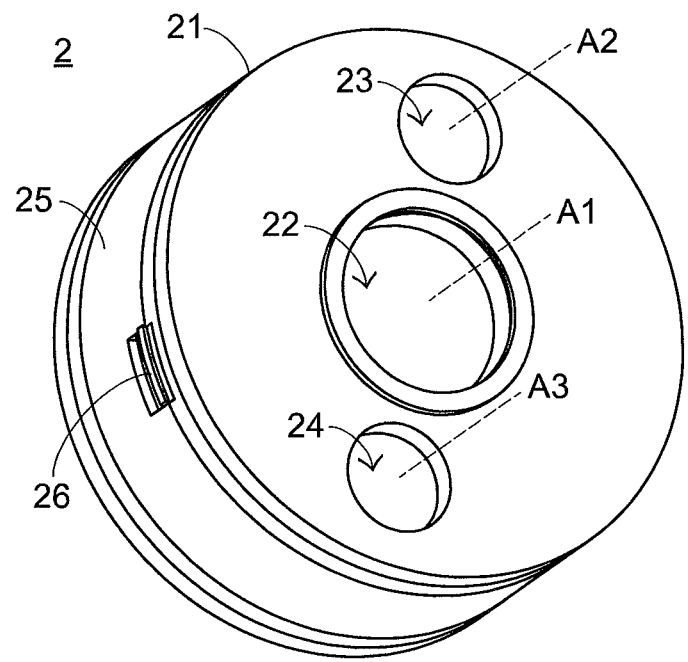
FIG. 3 is a schematic diagram illustrating the design of an assembly of zoom lens module according to a first embodiment of the present invention.
Figure 4:
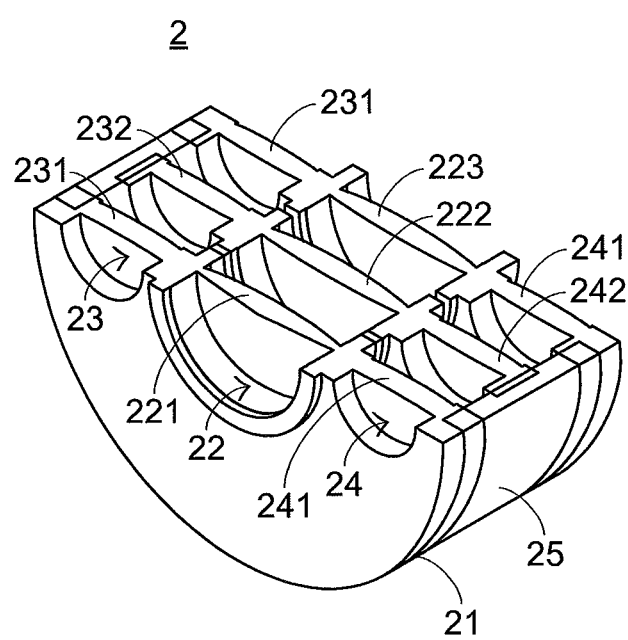
FIG. 4 is a schematic cross-view diagram illustrating the structures of the assembly of zoom lens module according to a first embodiment of the present invention.

An exemplary structure of an assembly of zoom lens modules in the present invention is illustrated first. FIG. 3 is a schematic diagram illustrating the design of an assembly of zoom lens module according to a first embodiment of the present invention. FIG. 4 is a schematic cross-view diagram illustrating the structures of the assembly of zoom lens module according to a first embodiment of the present invention. Please refer to FIG. 3 and FIG. 4, an assembly of zoom lens module 2 includes a housing 21, a main lens 22, a first associate lens 23, a second associate lens 24, a rotator mechanism 25, and a positioning structure 26. In the first embodiment, the main lens 22 is accommodated within the housing 21 and in the centric zones of the first associate lens 23 and the second associate lens 24. The main lens 22 includes staggered a first fixed main lens element 221, a second fixed main lens element 222, and a third fixed main lens element 223. The first fixed main lens element 221, the second fixed main lens element 222, together with the third fixed main lens element 223 define a main optical axis A1. Next, the first associate lens 23 deposited at the first side of the main lens 22 includes plural first fixed associate lens elements 231 and a first shiftable lens element 232 staggered with one another. The plural first fixed associate lens elements 231 together with the first shiftable lens element 232 define a first optical axis A2. Furthermore, the first shiftable lens element 232 is coupled to the rotator mechanism 25.

Similar to the first associate lens 23, the second associate lens 24 at the second side of the main lens 22 includes plural second fixed associate lens elements 241 and a second shiftable lens element 242 staggered with one another. The plural second fixed associate lens elements 241 together with the second shiftable lens element 242 define a second optical axis A3. The second shiftable lens element 242 is coupled to the rotator mechanism 25.

In manufacturing, the assembly of zoom lens module 2 is also called to include three lenses sheet (3P), while nevertheless, it is not limited to 3P and more lenses sheets are allowed. The first lenses sheet includes the first fixed main lens element 221, the first fixed associate lens element 231, and the second fixed associate lens element 241. The second lenses sheet includes the second fixed main lens element 222, the first shiftable lens element 232, and the second shiftable lens element 242. The third lenses sheet includes the third fixed main lens element 223, the other first fixed associate lens element 231, and the other second fixed associate lens element 241. Each of the lenses sheets may be formed by plastic injection molding.

In the first embodiment, the main lens 22, the first associate lens 23, and the second associate lens 24 are consisted of three lens elements, respectively. However, it is exemplary and not limited to in the present invention. In practice, the first associate lens or the second associate lens can be performed by single fixed lens element and single shiftable lens element in the present invention. Of course, the numbers of the lens elements for the main lens, the first associate lens, and the second associate lens can be designed for use and the same or not.

The rotator mechanism 25, deposited onto the housing 21, such as a middle outer ring onto the housing 21, is capable to change the related positions of the first shiftable lens element 232 and the second shiftable lens element 242 by operating, such as rotating, moving, or shifting, directly or indirectly, the coupled first shiftable lens element 232 and the second shiftable lens element 242. In the mean time, the first fixed main lens element 221, the second fixed main lens element 222, and the third fixed main lens element 223 are kept in a fixed staggered arrangement, as well as the main optical axis A1, the first optical axis A2, and the second optical axis A3 are kept fixed. Alternatively, the rotator mechanism 25 could be equipped with the positioning structure 26 to perform lock/release function to restrict/permit the operation of the rotator mechanism 25.

In the first embodiment, the rotator mechanism 25 can be driven by electrical force, but associated power and circuit are not shown in the drawings for clarification. Alternatively, the rotator mechanism 25 can be driven by other suitable forms of driven forces, such as magnetic, manual, opto-electronic ways, or combination thereof.

Figure 5:
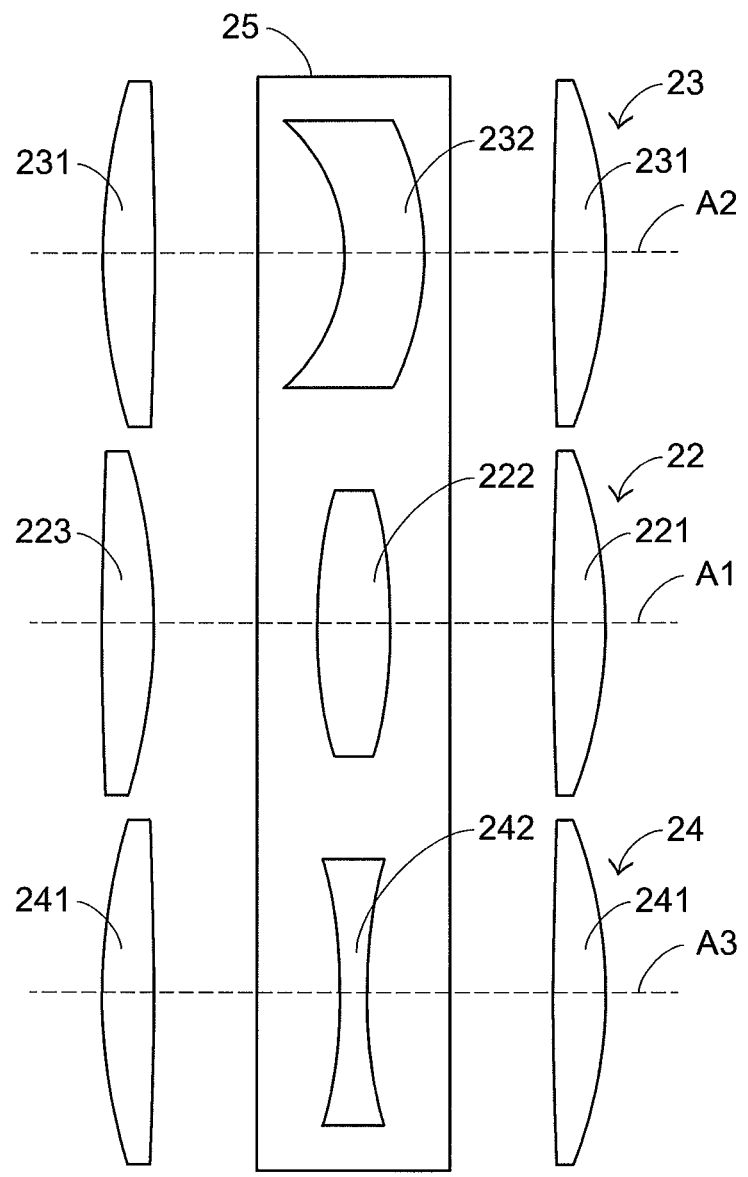
FIG. 5 is a schematic side-view diagram illustrating lenses configuration of the assembly of zoom lens module in the first embodiment.

The process on the assembly of zoom lens module 2 will be illustrated in the following paragraphs. FIG. 5 is a schematic side-view diagram illustrating lenses configuration of the assembly of zoom lens module in the first embodiment. Please refer to FIG. 3, FIG. 4, and FIG. 5, as shown, the first fixed main lens element 221, the second fixed main lens element 222, and the third fixed main lens element 223 are staggered aligned on the main optical axis A1, and hence, a first optical power is called to correspond to the main lens 22 consisted of the staggered first fixed main lens element 221, the second fixed main lens element 222, and the third fixed main lens element 223. Similarly, the plural first fixed associate lens elements 231 and the first shiftable lens element 232 are staggered aligned on the first optical axis A2, and a second optical power is corresponding to the first associate lens 23 consisted of the plural first fixed associate lens elements 231 and the first shiftable lens element 232. The plural second fixed associate lens elements 241 and the second shiftable lens element 242 are staggered aligned on the second optical axis A3, and a third optical power is corresponding to the second associate lens 24 consisted of the plural second fixed associate lens elements 241 and the second shiftable lens element 242.

Figure 6:
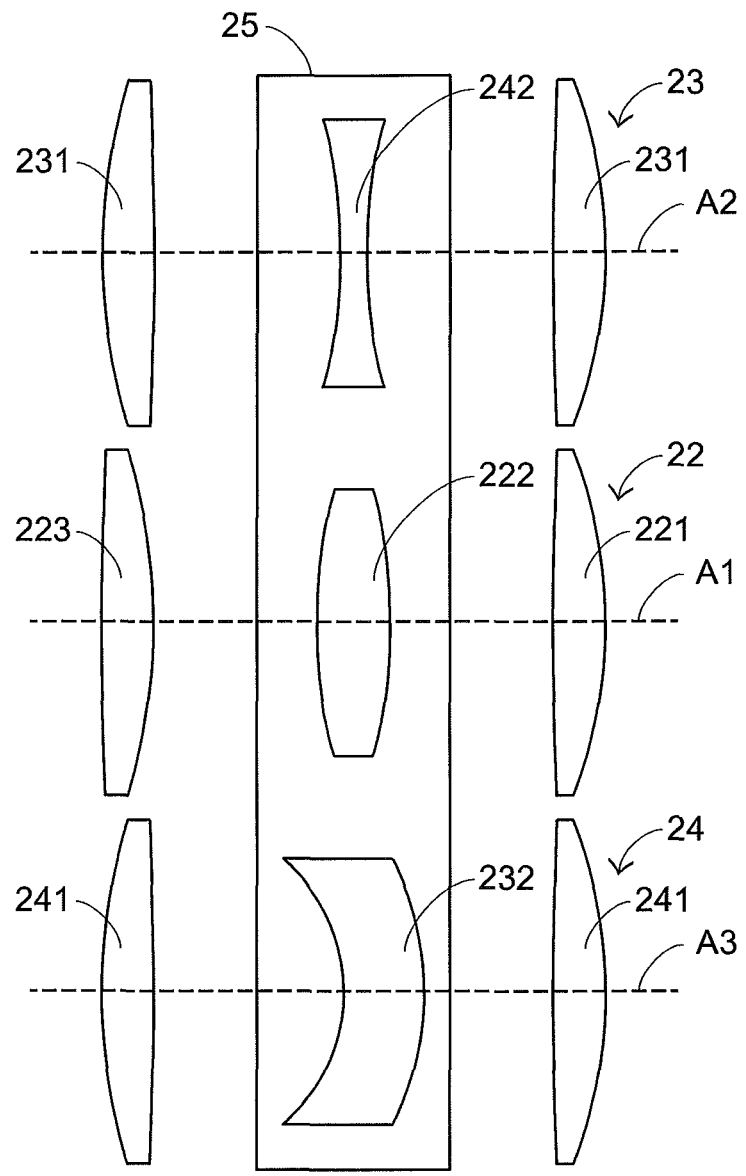
FIG. 6 is a schematic side-view diagram illustrating the shifted lenses of the assembly of zoom lens module according to the first embodiment of the present invention.

FIG. 6 is a schematic side-view diagram illustrating the shifted lenses of the assembly of zoom lens module according to the first embodiment of the present invention. Please refer to FIG. 5 and FIG. 6, a user could change the optical powers of the assembly of zoom lens module 2 by the following exemplary steps. The rotator mechanism 25 in a locked state could be released to become shiftable by sliding the positioning structure 26 to unlock the rotator mechanism 25. Next, the rotator mechanism 25 is driven to rotate, and the first shiftable lens element 232 and the second shiftable lens element 242 are shifted along with the operated rotator mechanism 25. In the first embodiment, the angle between the first associate lens 23 and the second associate lens 24 is about 180 degrees, and hence, the first shiftable lens element 232 is shifted to a position between the plural second fixed associate lens elements 241, as well as the second shiftable lens element 242 shifted to be between the plural first fixed associate lens elements 231, shown in FIG. 6.

In FIG. 6, by operating the rotator mechanism 25 to change the relative positions of the lens elements, the plural first fixed associate lens elements 231 and the shifted second shiftable lens element 242 are now deposited on the first optical axis A2, while the positions of the plural second fixed associate lens elements 241 and the shifted first shiftable lens element 232 are present on the second optical axis A3. Accordingly, the respective optical powers of the first associate lens 23 and the second associate lens 24 could be reformed by changing the staggered configurations of the first associate lens 23 and the second associate lens 24, and hence, the different zooming effects could be achieved.

It is noted that because of the differences of lens type and thickness in the first shiftable lens element 232 and the second shiftable lens element 242, the length from the first shiftable lens element 232 to an objective plane or an image plane is different from the one from the second shiftable lens element 242 to the object plane or the image plane, and hence, the optical powers of the first associate lens 23 and the second associate lens 24 could be changed or reformed by shifting them. Similarly, considering the differences of lens type and thickness in the first fixed associate lens element 231 and the second fixed associate lens element 241, new zoom effect could be performed by the reformed staggering arrangement on the first shiftable lens element 232 and the plural second fixed associate lens elements 241.

Figure 7:
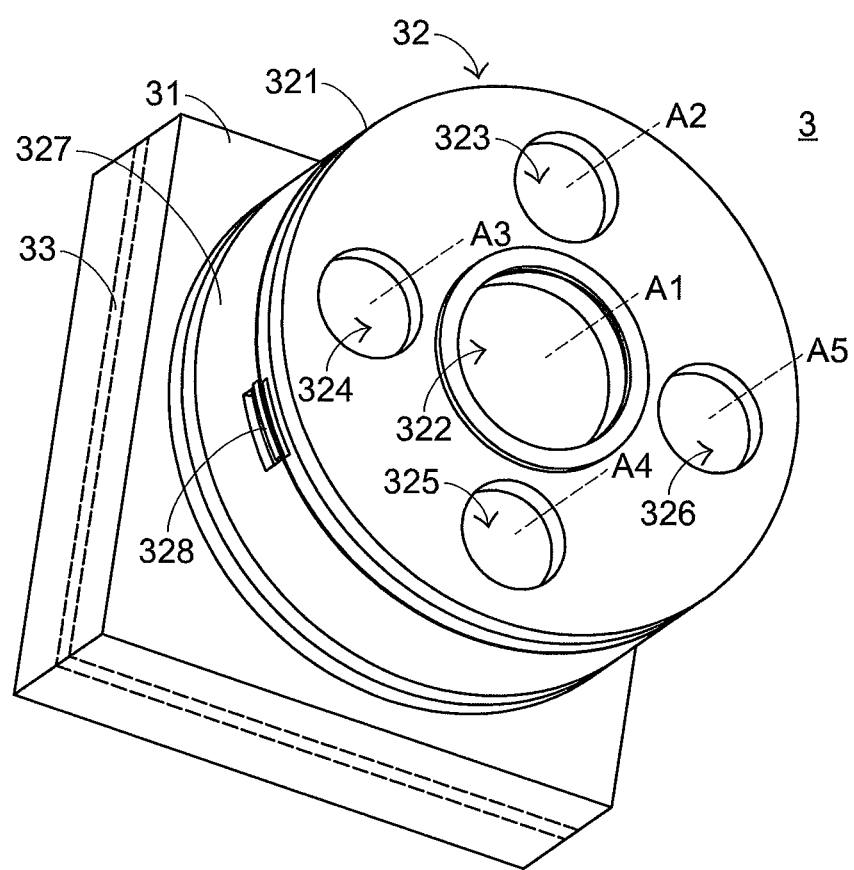
FIG. 7 is a schematic diagram illustrating the design of an assembly of zoom lens module according to a second embodiment of the present invention.
Figure 8:
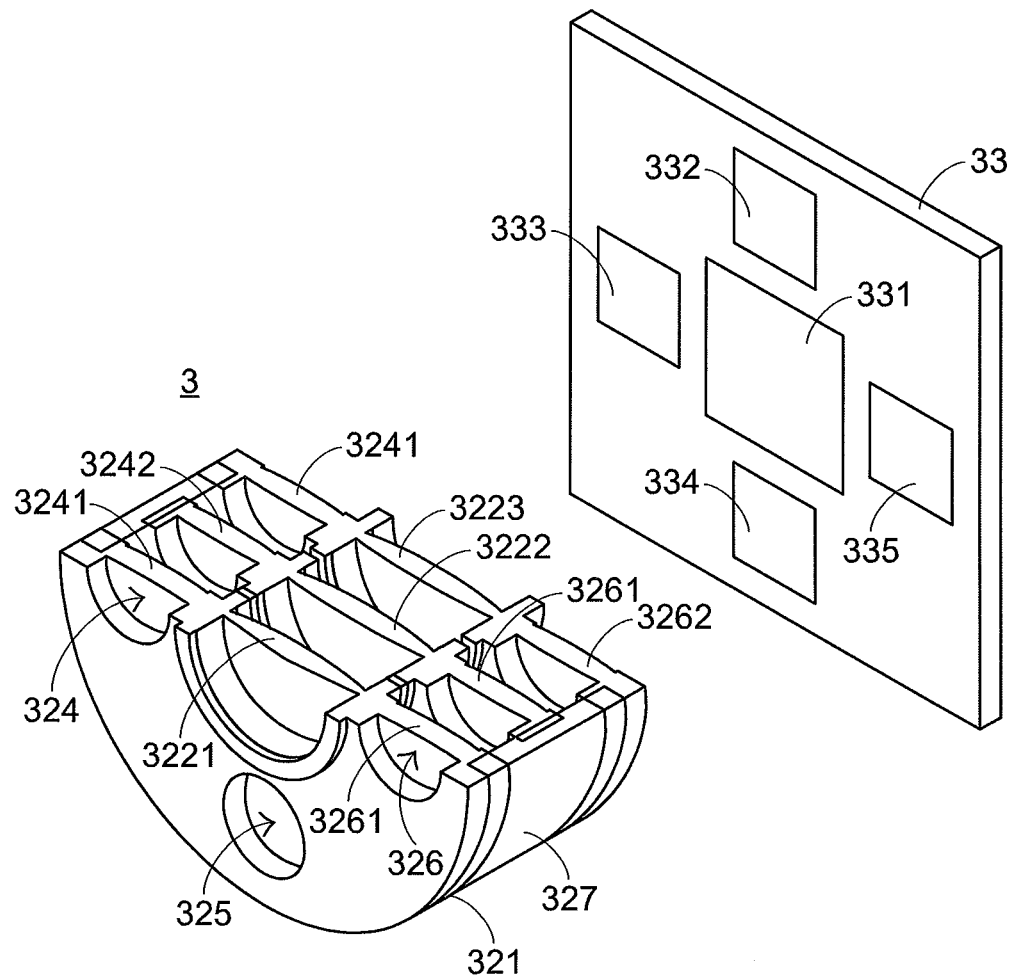
FIG. 8 is a schematic cross-view diagram illustrating the structures of the assembly of zoom lens module according to the second embodiment of the present invention.

Next, FIG. 7 is a schematic diagram illustrating the design of an assembly of zoom lens module according to a second embodiment of the present invention. FIG. 8 is a schematic cross-view diagram illustrating the structures of the assembly of zoom lens module according to the second embodiment of the present invention. Please refer to FIG. 7 and FIG. 8, an zoom imaging module 3 includes a base 31, an assembly of zoom lens module 32 coupled to the base 31, and a sensing member 33. The assembly of zoom lens module 32 includes a housing 321, a main lens 322, a first associate lens 323, a second associate lens 324, a third associate lens 325, a fourth associate lens 326, a rotator mechanism 327, and a positioning structure 328. The housing 321, the main lens 322, the rotator mechanism 327, and the positioning structure 328 are substantially identical to the ones in the first embodiment, so they will not be illustrated in the second embodiment. In the second embodiment, the sensing member 33, accommodated within the base 31, is deposited at one side of the main lens 322, the first associate lens 323, the second associate lens 324, the third associate lens 325, and the fourth associate lens 326. Furthermore, the sensing member 33 senses light that is derived from the outside of the base 31 and passes through the lenses (322~326), and performs imaging function. Furthermore, the sensing member 33 could be configured to sense the range of visible light, invisible light, or combination of visible and invisible light, wherein the invisible light may include infrared light, near-infrared light, and/or thermal light. Not limited to, the sensing member 33 could be one of a charge-coupled device, a complementary metal-oxide-semiconductor, or thermal sensors of different wavelength bands in the second embodiment.

Compared to the first embodiment, the structure of the main lens 322 in the assembly of zoom lens module 32 is similar to the main lens 22, which includes a first fixed main lens element 3221, a second fixed main lens element 3222, and a third fixed main lens element 3223. The main optical axis A1 in the second embodiment is defined by the first fixed main lens element 3221, the second fixed main lens element 3222, and the third fixed main lens element 3223. Next, the first associate lens 323 of the second embodiment is identical to the first associate lens 23 of the first embodiment, which includes plural first fixed associate lens elements and a first shiftable lens element staggered with one another (not shown in the figure). The first optical axis A2 is defined by the plural first fixed associate lens elements and the first shiftable lens element. The plural second fixed associate lens elements 3241 and a second shiftable lens element 3242 consist of the first associate lens 323, stagger with one another, and define the second optical axis A3 in the second embodiment.

Next, the third associate lens 325, similar to the second associate lens 24, includes multitudes of third fixed associate lens elements and a third shiftable lens element staggered with one another. A third optical axis A4 in the second embodiment is defined by the plural third fixed associate lens elements and the third shiftable lens element. A plurality of fourth fixed associate lens elements 3261 and a fourth shiftable lens element 3262 staggered with one another implement the fourth associate lens 326, and define a fourth optical axis A5. Moreover, the first shiftable lens elements, the second shiftable lens element 3242, the third shiftable lens elements, and the fourth shiftable lens element 3262 are coupled to the rotator mechanism 327, respectively, and shifted along with the rotator mechanism 327.

The operation of the first associate lens 323, the second associate lens 324, the third associate lens 325, the fourth associate lens 326, and the rotator mechanism 327 are substantially similar to the ones in the first embodiment. However, different from the one in the first embodiment, the rotator mechanism 327 is operated only about 90 degrees each time, and then the first associate lens 323, the second associate lens 324, the third associate lens 325, and the fourth associate lens 326 are shifted to reform the optical powers. The difference in operation aforementioned is due to the different position arrangement on the first associate lens 323, the second associate lens 324, the third associate lens 325, and the fourth associate lens 326. For example, when the rotator mechanism 327 is operated, the first shiftable lens element is shifted to form a new staggered configuration with the plural second fixed associate lens elements 3241, and hence, a different zoom effect is reformed by the second associate lens 324 in the new staggered configuration. In the mean time, as well as the second associate lens 324, the first associate lens 323, the third associate lens 325, and the fourth associate lens 326 could perform different zoom effects by the changed staggered configurations. These changed staggered configurations includes the second shiftable lens element 3242 shifted to be between the plural third fixed associate lens elements, the third shifted lens element shifted to be between the plural fourth fixed associate lens elements 3261, and the fourth shiftable lens element 3262 shifted to be between the plural first fixed associate lens elements. Consequently, there are different images captured by the sensing member 33.

It is noted that the sensing zones 331~335 of the sensing member 33 could cover the main lens 322, the first associate lens 323, the second associate lens 324, the third associate lens 325, and the fourth associate lens 326 to sense light passing through these lenses and execute imaging function, but not to limit in the present invention. Alternatively, the plural separated sensing zones 331~335 implementing a sensing member may be used to correspond to these lenses and capture five independent images. Besides, one or more optical stops could be mounted onto the rotator mechanism to associate with these associate lenses in the assembly of zoom lens module and the zoom imaging module of the present invention. The function of changing apertures performed by the optical stops could be associated with the operation of the rotator mechanism to change the apertures and field of views of these associate lenses, and hence, the variety of zoom effects can be achieved.

Accordingly, the assembly of zoom lens module and the zoom imaging module of the present invention is provided with the plural lenses. The associate lenses around the main lens could have shiftable associate lens elements which can be shifted along with the rotator mechanism in operation. The zoom effect performed by these associate lenses can be changed or reformed by operating the rotator mechanism to shift these shiftable lens elements, as well as the optical power and the field of views. By the cooperation of the shiftable lens elements and the rotator mechanism, the assembly of zoom lens module and the zoom imaging module of the present invention could perform various zoom effects. Thus, the weight and volume of the assembly of lens module may be kept slim, and the present drawbacks can be resolved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An assembly of zoom lens module comprising:
a housing;
a plurality of lenses staggered deposited within the housing, wherein each of the lenses comprises a plurality of lens elements and a plurality of optical axes defined by the lens elements; and
a rotator mechanism deposited onto the housing, the rotator mechanism shifting one of the lenses to change relative positions of the lens elements that correspond to the lenses different from the operated one, wherein the plural optical axes are kept fixed before and after operating the rotator mechanism.

2. The assembly of zoom lens module according to claim 1, wherein a main lens of the lenses comprises a first fixed main lens element and a second fixed main lens element, and the first fixed main lens element and the second fixed main lens element are kept a fixed staggered arrangement that is not subject to the rotator mechanism, and wherein the first fixed main lens element together with the second fixed main lens element defines a main optical axis of plural optical axes, and the first fixed main lens element and the second fixed main lens element are in center zones of a first associate lens and a second associate lens of the lenses, respectively.

3. The assembly of zoom lens module according to claim 2, wherein
the first associate lens and the second associate lens surround the main lens;
the first associate lens comprises:
a first fixed associate lens element deposited within the housing and positioned at a first side of the main lens; and
a first shiftable lens element positioned at one side of the first fixed associate lens element and coupled to the rotator mechanism, wherein staggered arrangement of the first fixed associate lens element and the first shiftable lens element is changed along with the operation of the rotator mechanism; and
the second associate lens comprises:
a second fixed associate lens element deposited within the housing and positioned at a second side of the main lens; and
a second shiftable lens element positioned at one side of the second fixed associate lens element and coupled to the rotator mechanism, wherein staggered arrangement of the second fixed associate lens element and the second shiftable lens element is changed along with the operation of the rotator mechanism.

4. The assembly of zoom lens module according to claim 3, wherein a first optical axis of the optical axes is defined by the first fixed associate lens element and the first shiftable lens element; a second optical axis of the optical axes is defined by the second fixed associate lens element and the second shiftable lens element; and when the rotator mechanism is operated, the first shiftable lens element is shifted to the side of the second fixed associate lens element and aligned on the second optical axis, and the second shiftable lens element is shifted to the side of the first fixed associate lens element and aligned on the first optical axis.

5. The assembly of zoom lens module according to claim 3, wherein
a third associate lens of the lenses together with the first associate lens and the second associate lens surround the main lens;
the third associate lens comprises:
a third fixed associate lens element deposited within the housing and positioned at a third side of the main lens; and
a third shiftable lens element positioned at one side of the third fixed associate lens element and coupled to the rotator mechanism, wherein staggered arrangement of the third fixed associate lens element and the third shiftable lens element is changed along with the operation of the rotator mechanism.

6. The assembly of zoom lens module according to claim 5, wherein a first optical axis of the optical axes is defined by the first fixed associate lens element and the first shiftable lens element; a second optical axis of the optical axes is defined by the second fixed associate lens element and the second shiftable lens element; a third optical axis of the optical axes is defined by the third fixed associate lens element and the third shiftable lens element; and when the rotator mechanism is operated, the first shiftable lens element is shifted to the side of the second fixed associate lens element and aligned on the second optical axis, the second shiftable lens element is shifted to the side of the third fixed associate lens element and aligned on the third optical axis, and the third shiftable lens element is shifted to the side of the first fixed associate lens element and aligned on the first optical axis.

7. The assembly of zoom lens module according to claim 1, wherein the rotator mechanism is associated with manual form, mechanical form, electric form, magnetic form, opto-electronic form, or the combination thereof.

8. The assembly of zoom lens module according to claim 1, further comprising a positioning mechanism deposited onto the rotator mechanism, wherein the positioning mechanism performs lock function to restrict the operation of the rotator mechanism, or release function to permit the operation of the rotator mechanism.

9. An assembly of zoom lens module, comprising:
a housing;
a plurality of lenses staggered deposited within the housing, wherein each of the lenses comprises a plurality of lens elements and a plurality of optical axes defined by the lens elements of each of the lenses; and
a rotator mechanism deposited onto the housing, the rotator mechanism shifting one of the lenses to change relative positions of the lens elements that correspond to the lenses different from the operated one, wherein the plural optical axes are kept fixed before and after operating the rotator mechanism.

10. The assembly of zoom lens module according to claim 9, wherein a fixed lens of the lenses comprises a first fixed associate lens element, a first fixed main lens element and a second fixed associate lens element, and the first fixed main lens element, the first fixed associate lens element, and the second fixed associate lens element are kept a fixed arrangement that is not subject to the rotator mechanism, and wherein the first fixed main lens element is in center zones of the first fixed associate lens element and the second associate lens element.

11. The assembly of zoom lens module according to claim 10, wherein a second lens of the lenses is at one side of the first lens and coupled to the rotator mechanism; the second lens comprises a first shiftable lens element, a second fixed main lens element, and a second shiftable lens element; the second fixed main lens element is in center zones of the first shiftable lens element and the second shiftable lens element; and the first shiftable lens element and the second shiftable lens element are shifted along with the operation of the rotator mechanism.

12. The assembly of zoom lens module according to claim 11, wherein the first fixed main lens element and the second fixed main lens element are staggered to form a main lens; the first fixed associate lens element and the first shiftable lens element are staggered to form a first associate lens; the second fixed associate lens element and the second shiftable lens element are staggered to from a second associate lens, and staggered arrangement of the lens elements that belong to the first associate lens and the second associate lens is changed along with the operation of the rotator mechanism.

13. The assembly of zoom lens module according to claim 11, wherein a first optical axis of the optical axes is defined by the first fixed associate lens element and the first shiftable lens element; a second optical axis of the optical axes is defined by the second fixed associate lens element and the second shiftable lens element; and when the rotator mechanism is operated, the first shiftable lens element is shifted to the side of the second fixed associate lens element and aligned on the second optical axis, and the second shiftable lens element is shifted to the side of the first fixed associate lens element and aligned on the first optical axis.

14. A zoom imaging module, comprising:
a base;
an assembly of zoom lens module, the assembly of zoom lens module comprising:
a housing;
a plurality of lenses staggered deposited within the housing, wherein each of the lenses comprises a plurality of lens elements and a plurality of optical axes defined by the lens elements; and
a rotator mechanism deposited onto the housing, the rotator mechanism shifting one of the lenses to change relative positions of the lens elements that correspond to the lenses different from the operated one, wherein the plural optical axes are kept fixed before and after operating the rotator mechanism; and
a sensing member deposited within the housing and sensing outside light.

15. The zoom imaging module according to claim 14, wherein a main lens of the lenses comprises a first fixed main lens element and a second fixed main lens element, and the first fixed main lens element and the second fixed main lens element are kept a fixed staggered arrangement that is not subject to the rotator mechanism, and wherein the first fixed main lens element together with the second fixed main lens element defines a main optical axis of plural optical axes, and the first fixed main lens element and the second fixed main lens element are in center zones of a first associate lens and a second associate lens of the lenses, respectively.

16. The zoom imaging module according to claim 15, wherein
the first associate lens and the second associate lens surround the main lens;
the first associate lens comprises:
a first fixed associate lens element deposited within the housing and positioned at a first side of the main lens; and
a first shiftable lens element positioned at one side of the first fixed associate lens element and coupled to the rotator mechanism, wherein staggered arrangement of the first fixed associate lens element and the first shiftable lens element is changed along with the operation of the rotator mechanism; and
the second associate lens comprises:
a second fixed associate lens element deposited within the housing and positioned at a second side of the main lens; and
a second shiftable lens element positioned at one side of the second fixed associate lens element and coupled to the rotator mechanism, wherein staggered arrangement of the second fixed associate lens element and the second shiftable lens element is changed along with the operation of the rotator mechanism.

17. The zoom imaging module according to claim 16, wherein a first optical axis of the optical axes is defined by the first fixed associate lens element and the first shiftable lens element; a second optical axis of the optical axes is defined by the second fixed associate lens element and the second shiftable lens element; and when the rotator mechanism is operated, the first shiftable lens element is shifted to the side of the second fixed associate lens element and aligned on the second optical axis, and the second shiftable lens element is shifted to the side of the first fixed associate lens element and aligned on the first optical axis.

18. The zoom imaging module according to claim 17, wherein
a third associate lens of the lenses together with the first associate lens and the second associate lens surround the main lens;
the third associate lens comprises:
a third fixed associate lens element deposited within the housing and positioned at a third side of the main lens; and
a third shiftable lens element positioned at one side of the third fixed associate lens element and coupled to the rotator mechanism, wherein staggered arrangement of the third fixed associate lens element and the third shiftable lens element is changed along with the operation of the rotator mechanism.

19. The zoom imaging module according to claim 18, wherein a first optical axis of the optical axes is defined by the first fixed associate lens element and the first shiftable lens element; a second optical axis of the optical axes is defined by the second fixed associate lens element and the second shiftable lens element; a third optical axis of the optical axes is defined by the third fixed associate lens element and the third shiftable lens element; and when the rotator mechanism is operated, the first shiftable lens element is shifted to the side of the second fixed associate lens element and aligned on the second optical axis, the second shiftable lens element is shifted to the side of the third fixed associate lens element and aligned on the third optical axis, and the third shiftable lens element is shifted to the side of the first fixed associate lens element and aligned on the first optical axis.

20. The zoom imaging module according to claim 14, wherein the sensing member is divided into plural sensing zones corresponding to the lenses, or is consisted of plural individual sensing blocks.

21. The zoom imaging module according to claim 14, wherein the sensing member is configured to sense the ranges of visible light, invisible light, or the combination of the visible and invisible light.

22. The zoom imaging module according to claim 21, wherein the invisible light comprises infrared light, near-infrared light, thermal light, or the combination thereof.

* * * * *